(12) United States Patent
Shimada

(10) Patent No.: US 10,896,210 B2
(45) Date of Patent: Jan. 19, 2021

(54) INFORMATION PROCESSING APPARATUS TO SUGGEST A SERVICE IN RESPONSE TO A REQUESTED SERVICE CONTENT BASED ON USE AND NON-USE HISTORY OF THE SERVICE

(71) Applicant: FUJI XEROX CO., LTD., Tokyo (JP)

(72) Inventor: Yuhei Shimada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 222 days.

(21) Appl. No.: 15/942,849

(22) Filed: Apr. 2, 2018

(65) Prior Publication Data

US 2019/0012370 A1 Jan. 10, 2019

(30) Foreign Application Priority Data

Jul. 7, 2017 (JP) .................................. 2017-133924

(51) Int. Cl.

| G06F 3/01 | (2006.01) |
|---|---|
| G06F 16/34 | (2019.01) |
| G06F 16/33 | (2019.01) |
| H04L 12/58 | (2006.01) |
| G06F 16/31 | (2019.01) |
| G06F 17/30 | (2006.01) |
| G06F 16/36 | (2019.01) |

(Continued)

(52) U.S. Cl.
CPC ............ *G06F 16/313* (2019.01); *G06F 16/36* (2019.01); *G06F 17/30616* (2013.01); *G06F 17/30731* (2013.01); *G06F 40/268* (2020.01); *G06Q 30/02* (2013.01)

(58) Field of Classification Search
CPC ..... H04L 51/046; G06F 3/018; G06F 16/345; G06F 16/3346; G06Q 30/0625
USPC ........................................... 715/758; 707/727
See application file for complete search history.

(56) References Cited

U.S. PATENT DOCUMENTS

| 10,198,763 B2 * | 2/2019 | Amjadi .............. G06Q 30/0625 |
| 2015/0207765 A1 * | 7/2015 | Brantingham ........ H04L 51/046 |
| | | 715/758 |

(Continued)

FOREIGN PATENT DOCUMENTS

JP 6037590 B1 12/2016

*Primary Examiner* — Farzad Kazeminezhad
(74) *Attorney, Agent, or Firm* — Oliff PLC

(57) ABSTRACT

An information processing apparatus includes a memory, a reception unit, an acquisition unit, and a presentation unit. The memory stores, as history information, first information including attribute information of a user and service contents desired by the user, second information including service contents suggested to the service contents and a message prompting use of the service contents, and success/failure information indicating whether or not a service has been used and a successful result has been obtained. The reception unit receives the first information. The acquisition unit searches the history information for the first information with a similarity with respect to the received first information that reaches a threshold and acquires the second information corresponding to the found first information. The presentation unit extracts a word, based on the number of appearance times and the success/failure information, from the message included in the acquired second information and presents the word.

12 Claims, 13 Drawing Sheets

| APPROACH ID | APPROACH PERSON ID | REQUEST ID | APPROACH DATE AND TIME | MESSAGE | APPROACH RESULT |
|---|---|---|---|---|---|
| A659 | U003 | R079 | AUGUST 4, 2016 10:11:02 | HIGH-PRIORITY AVAILABILITY OF THIS COWORKING SPACE IS PROVIDED TO USERS WHO REQUIRE CONCENTRATION ON SOMETHING. ⋯ INFORMATION OF NEARBY PLACES FOR LUNCH IS ⋯ | SUCCESS (USE) |
| A661 | U356 | R079 | AUGUST 5, 2016 7:33:43 | A SEMINAR FOR USERS INTERESTED IN STARTING A BUSINESS WILL BE BEING HELD AT A SEMINAR ROOM ON THE DESIGNATED DATE. IF YOU HAVE TIME, ⋯ AVAILABILITY OF SEATS ⋯ | FAILURE (NON-USE) |

12a

(51) Int. Cl.
*G06Q 30/02* (2012.01)
*G06F 40/268* (2020.01)

(56) References Cited

U.S. PATENT DOCUMENTS

2016/0078038 A1* 3/2016 Solanki ................. G06F 16/345
 707/727
2018/0217674 A1* 8/2018 Gao ........................ G06F 3/018
2018/0307748 A1* 10/2018 Freilinger ............. G06F 16/337

* cited by examiner

FIG. 7

| APPROACH ID | APPROACH PERSON ID | REQUEST ID | APPROACH DATE AND TIME | MESSAGE | APPROACH RESULT |
|---|---|---|---|---|---|
| A659 | U003 | R079 | AUGUST 4, 2016 10:11:02 | HIGH-PRIORITY AVAILABILITY OF THIS COWORKING SPACE IS PROVIDED TO USERS WHO REQUIRE CONCENTRATION ON SOMETHING. ... INFORMATION OF NEARBY PLACES FOR LUNCH IS ... | SUCCESS (USE) |
| A661 | U356 | R079 | AUGUST 5, 2016 7:33:43 | A SEMINAR FOR USERS INTERESTED IN STARTING A BUSINESS WILL BE BEING HELD AT A SEMINAR ROOM ON THE DESIGNATED DATE. IF YOU HAVE TIME, ... AVAILABILITY OF SEATS ... | FAILURE (NON-USE) |

12a

INFORMATION PROCESSING APPARATUS TO SUGGEST A SERVICE IN RESPONSE TO A REQUESTED SERVICE CONTENT BASED ON USE AND NON-USE HISTORY OF THE SERVICE

CROSS-REFERENCE TO RELATED APPLICATIONS

This application is based on and claims priority under 35 USC 119 from Japanese Patent Application No. 2017-133924 filed Jul. 7, 2017.

BACKGROUND

Technical Field

The present invention relates to an information processing apparatus.

SUMMARY

According to an aspect of the invention, there is provided an information processing apparatus including a memory, a reception unit, an acquisition unit, and a presentation unit. The memory stores, as history information, first information including attribute information of a user and service contents desired by the user, second information including service contents suggested to the service contents and a message prompting use of the service contents, and success/failure information indicating whether or not a service has been used and a successful result has been obtained. The reception unit receives the first information. The acquisition unit searches the history information for the first information with a similarity with respect to the received first information that reaches a threshold and acquires the second information corresponding to the first information found by the search from the history information. The presentation unit extracts a word, based on the number of appearance times and the success/failure information, from the message included in the acquired second information and presents the word.

BRIEF DESCRIPTION OF THE DRAWINGS

Exemplary embodiments of the present invention will be described in detail based on the following figures, wherein:

FIG. 7 is a diagram illustrating an example of approach information corresponding to the request information illustrated in FIG. 6;

DETAILED DESCRIPTION

Hereinafter, exemplary embodiments of the present invention will be described with reference to drawings. In each of the drawings, components having substantially the same function will be referred to with the same signs, and redundant explanation will be omitted.

Summary of Exemplary Embodiments

An information processing apparatus according to an exemplary embodiment of the present invention includes a memory that stores, as history information, first information including attribute information of a user and service contents desired by the user, second information including service contents suggested to the service contents and a message prompting use of the service contents, and success/failure information indicating whether or not a service has been used and a successful result has been obtained; a reception unit that receives the first information; an acquisition unit that searches the history information for the first information with a similarity with respect to the received first information that satisfies a threshold and acquires the second information corresponding to the first information found by the search from the history information; and a presentation unit that extracts a word, based on the number of appearance times and the success/failure information, from the message included in the acquired second information and presents the word.

The user may be an individual or an organization such as a group including plural people. The expression "with a similarity that satisfies a threshold" represents, for example, a state in which similarity is equal to or more than a threshold when a target with a similarity equal to or more than the threshold is searched for or a state in which similarity is less than a threshold when a target with a similarity less than the threshold is searched for.

The presentation unit may extract and present only a word related to used second information or extract and present a word for which the number of appearance times is equal to or more than a specific value. Parts of speech of words presented by the presentation unit include noun, verb, conjunction, adjective, adjective verb, auxiliary verb, preposition, adverb, pre-noun adjective, and interjection. However, a part of speech (for example, noun) may be extracted.

Words may be presented to an external apparatus such as a terminal apparatus. In the case where the information processing apparatus includes an output unit such as a display, a printing unit, or the like, words may be presented to the output unit.

First Exemplary Embodiment

Figure 1:
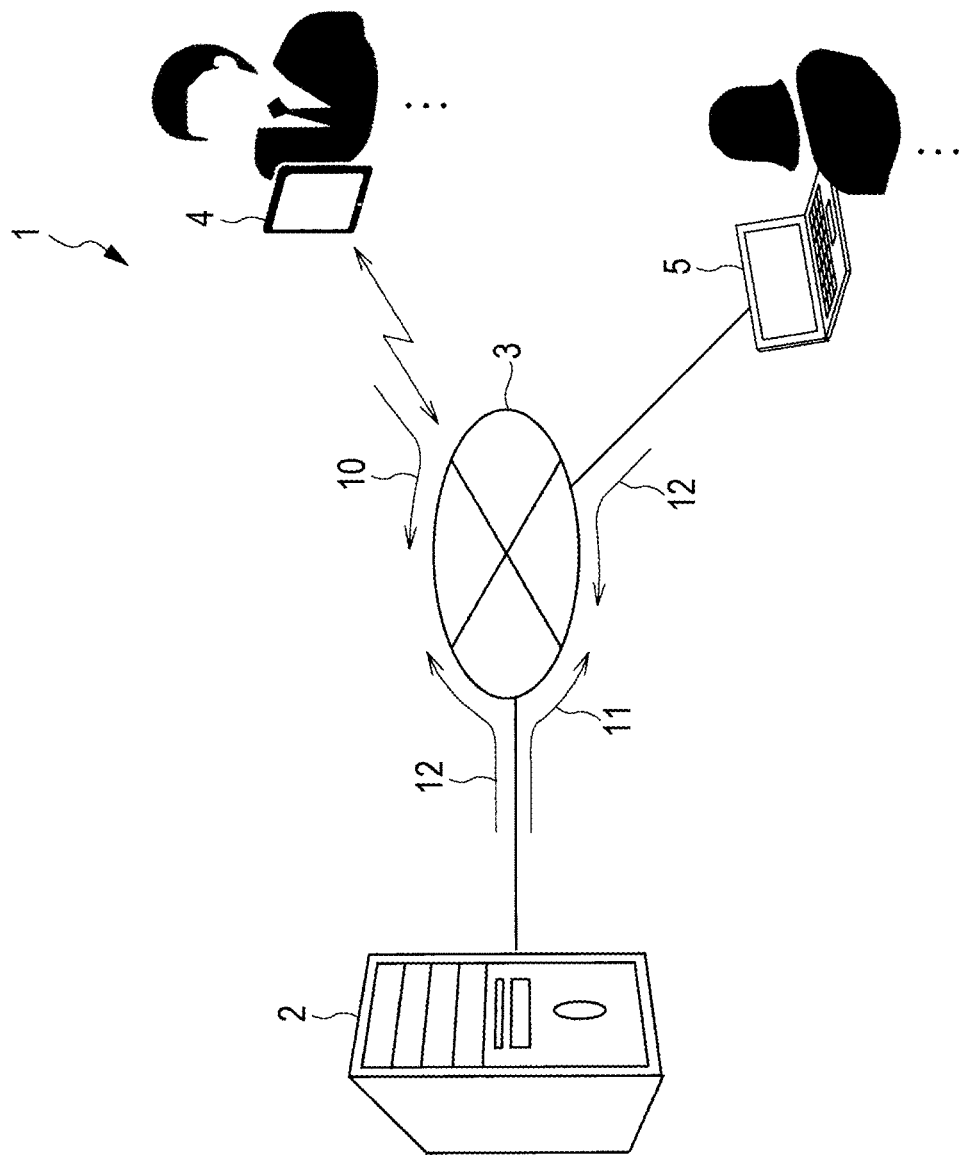
FIG. 1 is a diagram illustrating an example of an information processing system according to a first exemplary embodiment of the present invention.

FIG. 1 is a diagram illustrating an example of an information processing system according to a first exemplary embodiment of the present invention. An information processing system 1 according to the first exemplary embodiment includes a server apparatus 2, plural user terminal apparatuses 4 and plural business operator terminal apparatuses 5 that are connected to the server apparatus 2 via a network 3. The server apparatus 2 is an example of an information processing apparatus. Each of the business operator terminal apparatuses 5 is an example of an external apparatus.

The server apparatus 2 transmits approach creation screen information 11 that is created based on request information 10 transmitted from a user terminal apparatus 4 to each of the business operator terminal apparatuses 5. The server apparatus 2 also transmits approach information 12 that is created based on the approach creation screen information 11 and transmitted from each of the business operator terminal apparatuses 5 to the corresponding user terminal apparatus 4. The request information is an example of first information. The approach information is an example of second information.

The network 3 may be, for example, a local area network (LAN), the Internet, or the like. The network 3 may be wired or wireless.

The user terminal apparatuses 4 are, for example, used by users. The user terminal apparatuses 4 transmit the request information 10 to the server apparatus 2. A user is an example of a user.

The business operator terminal apparatuses 5 are, for example, used by business operators. The business operator terminal apparatuses 5 transmit the approach information 12 to the server apparatus 2. A business operator performs, for example, a service for providing a place to a user. Places provided by business operators are, for example, common spaces that plural people may use, such as coworking spaces, shared offices, rental offices, and the like. Services provided by business operators are not limited to a service that provides a place. Other services such as a service for making an appointment at a beauty salon may be provided.

"Request" represents transmitting request information including service contents desired by a user from the user terminal apparatus 4 to the server apparatus 2. Request information includes various items such as user attribute information (for example, a user ID, a company name, a department name, etc.), service contents desired by the user (hereinafter, also referred to as "request contents), and the like. Request contents include, for example, desired date and time zone, option contents, a place, and the like. Option contents are desired contents such as environment of a place or the like. Option contents include, for example, the degree of concentration indicating the degree to which a user is able to concentrate, the degree of congestion indicating the degree to which congestion occurs, presence or absence of desire for communication with other users, presence or absence of desire for free drink, and the like.

"Approach" represents transmitting the approach information 12 including service contents provided by a business operator from the business operator terminal apparatus 5 to the server apparatus 2. The approach information 12 includes various items including a request ID for identifying the request information 10, service contents (hereinafter, also referred to as "approach contents") provided by a business operator, a message prompting use of the service, and the like.

Figure 2:
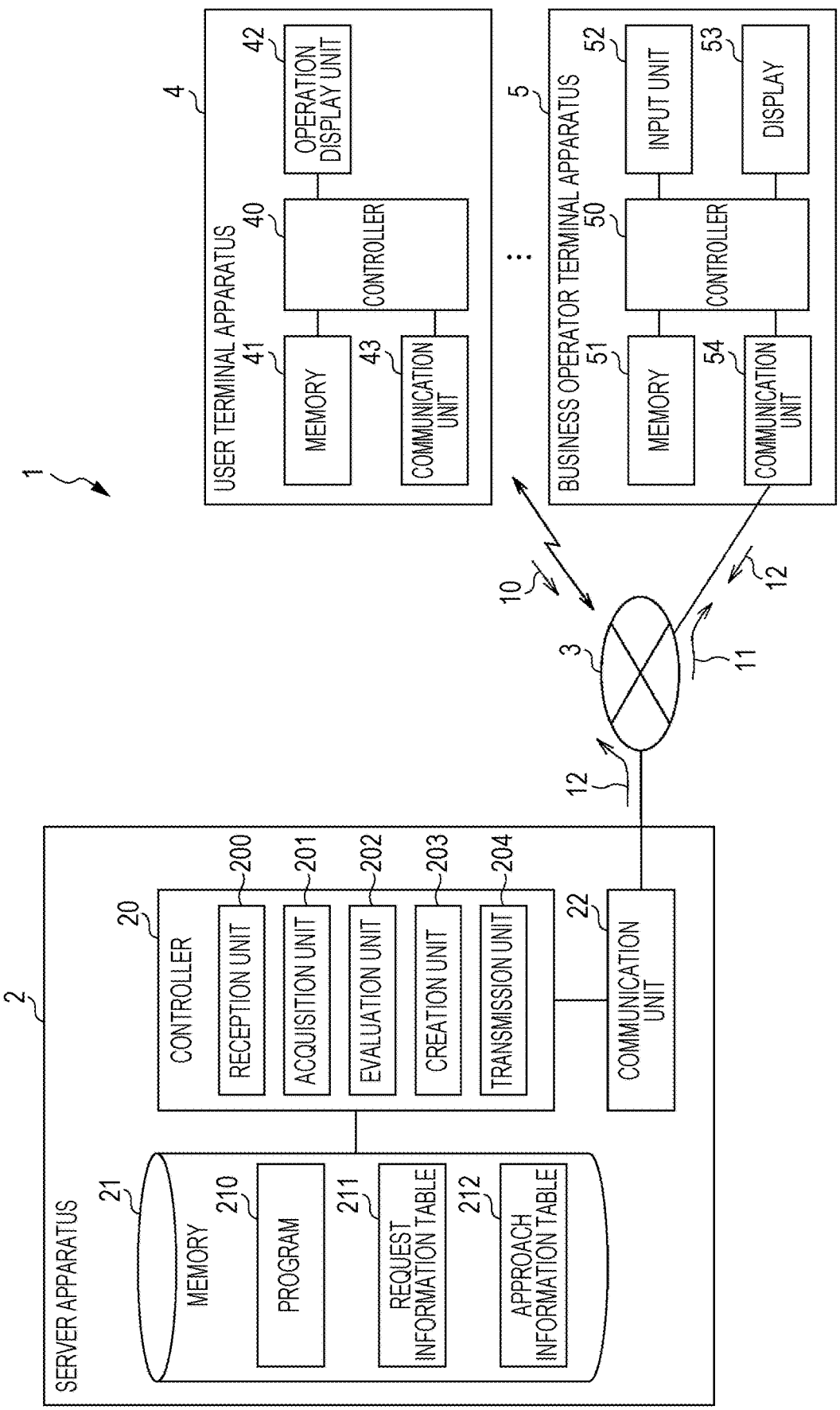
FIG. 2 is a block diagram illustrating a control system of the information processing system illustrated in FIG. 1.

FIG. 2 is a block diagram illustrating a control system of the information processing system 1. First, the user terminal apparatuses 4 and the business operator terminal apparatuses 5 will be explained, and then, the server apparatus 2 will be explained.

(Configuration of User Terminal Apparatus)

The user terminal apparatuses 4 each include a controller 40 that controls each unit of the user terminal apparatus 4, a memory 41 that stores various types of information, an operation display unit 42, and a communication unit 43 that is implemented by a network interface card (NIC) or the like and communicates with the outside via the network 3. As the user terminal apparatus 4, for example, an information terminal apparatus such as a personal computer or a multi-function mobile phone (smartphone) may be used.

The operation display unit 42 is, for example, a touch panel display. The operation display unit 42 has a configuration in which a touch panel is superimposed on a display such as a liquid crystal display. The operation display unit 42 may include a display and an input unit that are separated from each other.

(Configuration of Business Operator Terminal Apparatus)

The business operator terminal apparatuses 5 each include a controller 50 that controls each unit of the business operator terminal apparatus 5, a memory 51 that stores various types of information, a input unit 52 that is implemented by a keyboard, a mouse, and the like, a display 53 that is implemented by a liquid crystal display, and a communication unit 54 that is implemented by an NIC or the like and communicates with the outside via the network 3. The business operator terminal apparatus 5 transmits the approach information 12 to the server apparatus 2, and then, transmits an approach result, along with an approach ID, to the server apparatus 2.

(Configuration of Server Apparatus)

The server apparatus 2 is implemented by a controller 20 that controls each unit of the server apparatus 2, a memory 21 that stores various types of information, and a communication unit 22 that is implemented by an NIC or the like and communicates with the outside via the network 3.

The controller 20 includes a central processing unit (CPU), an interface, and the like. The CPU functions as a reception unit 200, an acquisition unit 201, an evaluation unit 202, a creation unit 203, a transmission unit 204, and the like by operating in accordance with a program 210. The details of the reception unit 200, the acquisition unit 201, the evaluation unit 202, the creation unit 203, and the transmission unit 204 will be described later. The evaluation unit 202, the creation unit 203, and the transmission unit 204 are an example of a presentation unit.

The memory 21 includes a read only memory (ROM), a random access memory (RAM), a hard disk, and the like and stores the program 210, a request information table 211, an approach information table 212, and the like. The request information table 211 and the approach information table 212 are an example of history information.

Figure 3A:
FIG. 3A is a diagram illustrating an example of a request information table.

FIG. 3A is a diagram illustrating an example of the request information table 211. In the request information table 211, user attribute information, a request date and time, request contents, and the like are recorded in association with a request ID for identifying the request information 10. User attribute information includes a user ID for identifying a user, an age group, sex, an occupation, a business category, a company to which the user belongs, and the like. A request date and time may further include a time zone. Hereinafter, the term "record" is used for a case where information is written into a table, and the term "store" is used for a case where information is written into a memory.

Figure 3B:
FIG. 3B is a diagram illustrating an example of an approach information table.

FIG. 3B is a diagram illustrating an example of the approach information table 212. In the approach information table 212, a request ID, business operator attribute information, an approach date and time, approach contents, a message, an approach result, and the like are recorded in association with an approach ID for identifying the approach information 12. Business operator attribute information includes a business operator ID for identifying a business operator, the business category of the business operator, and the like. Plural approach IDs may be associated with a request ID. Alternatively, an approach ID may be associated with plural request IDs. A request date and time may further include a time zone.

The reception unit 200 assigns a request ID to the request information 10 transmitted from the user terminal apparatus 4, and the request information 10 that is assigned the request ID is recorded into the request information table 211. Furthermore, the reception unit 200 assigns an approach ID to the approach information 12 transmitted from the business operator terminal apparatus 5, and the approach information 12 that is assigned the approach ID is recorded into the approach information table 212. The approach ID is transmitted to the business operator terminal apparatus 5 by the transmission unit 204.

The acquisition unit 201 searches the request information table 211 for request information with a similarity with respect to the request information 10 currently received by the reception unit 200 that satisfies a threshold and acquires approach information corresponding to the found request information from the approach information table 212. Specifically, the acquisition unit 201 searches for user attribute information and request contents with a similarity with respect to user attribute information and request contents of the request information 10 currently received by the reception unit 200 that satisfies a threshold and acquires a request ID corresponding to the found user attribute information and request contents from the request information table 211. Then, the acquisition unit 201 acquires approach information corresponding to the acquired request ID from the approach information table 212.

Similarity is determined based on items configuring user attribute information and request contents. Similarity may be calculated, for example, using cosine similarity. A cosine similarity of a value closer to 1 represents that two items are more similar to each other. In contrast, a cosine similarity of a value closer to 0 represents that two items are less similar to each other. In this case, the threshold is a value between 0 and 1. Similarity is not necessarily calculated using cosine similarity. Other indices such as a Pearson's correlation coefficient, a deviation pattern similarity, and the like may be used. Furthermore, by defining the total value of differences of item values of individual items as a distance, and the total distance may be used as a similarity. In this case, a lower similarity represents that two items are more similar to each other, and a higher similarity represents that two items are less similar to each other.

The evaluation unit 202 extracts a word on the basis of the number of appearance times and an approach result from a message included in approach information acquired by the acquisition unit 201. Specifically, the evaluation unit 202 performs morphological analysis of a message to extract a noun. A noun is an example of a word. The evaluation unit 202 calculates a score for each noun by multiplying the number of appearance times by a coefficient corresponding to an approach result. A score is an example of an evaluation value. A higher score of a noun is obtained as the number of appearance times increases and a result becomes more excellent. A coefficient based on similarity of request information may further be considered.

The score of a noun is calculated, for example, as described below.

Score of noun=coefficient $\alpha \times M$(times)+coefficient $\beta \times N$(times), where $\alpha$: success (use) represents 1.0, $\beta$: failure (non-use) represents −0.4, and M (times) and N (times) represent the number of pieces of approach information in which a corresponding noun appears.

The score of a noun may also be calculated as described below.

Score of noun=coefficient $\alpha$ for use (success)$\times M$ (times)+coefficient $\beta$ for non-use (failure without reservation)$\times N$(times)+coefficient $\gamma$ for non-use (failure with reservation)$\times K$(times), where $\alpha$: success (use) represents 1.0, $\beta$: failure (non-use without reservation) represents −0.4, $\gamma$: failure (non-use with reservation) represents 0.2, and M (times), N (times), and K (times) represent the number of pieces of approach information in which a corresponding noun appears.

Only used (successful) approach information may be acquired. Thus, a word with a high success rate may be presented. Furthermore, a word for which the number of appearance times for messages for used approach information is equal to or more than a threshold may be extracted.

The evaluation unit 202 calculates a score for each word and then creates a word list including words and scores.

The creation unit 203 extracts plural (for example, three) words with highest scores from the word list and creates an advice for a message. The creation unit 203 creates the approach creation screen information 11 including user attribute information, request contents, an advice for a message, and an input area for the message. The approach creation screen information 11 is an example of reference information.

The transmission unit 204 transmits the approach creation screen information 11 created by the creation unit 203 to the registered business operator terminal apparatuses 5. The transmission unit 204 may transmit a word list, along with the request information, to the business operator terminal apparatuses 5.

(Operation of Information Processing System)

Figure 11:
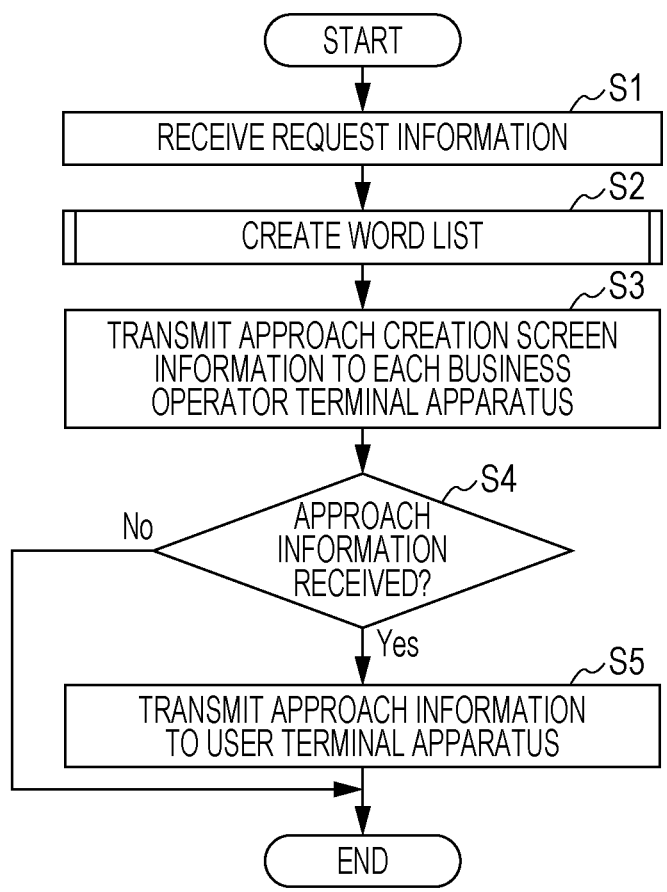
FIG. 11 is a flowchart illustrating an example of an operation of a server apparatus.
Figure 12:
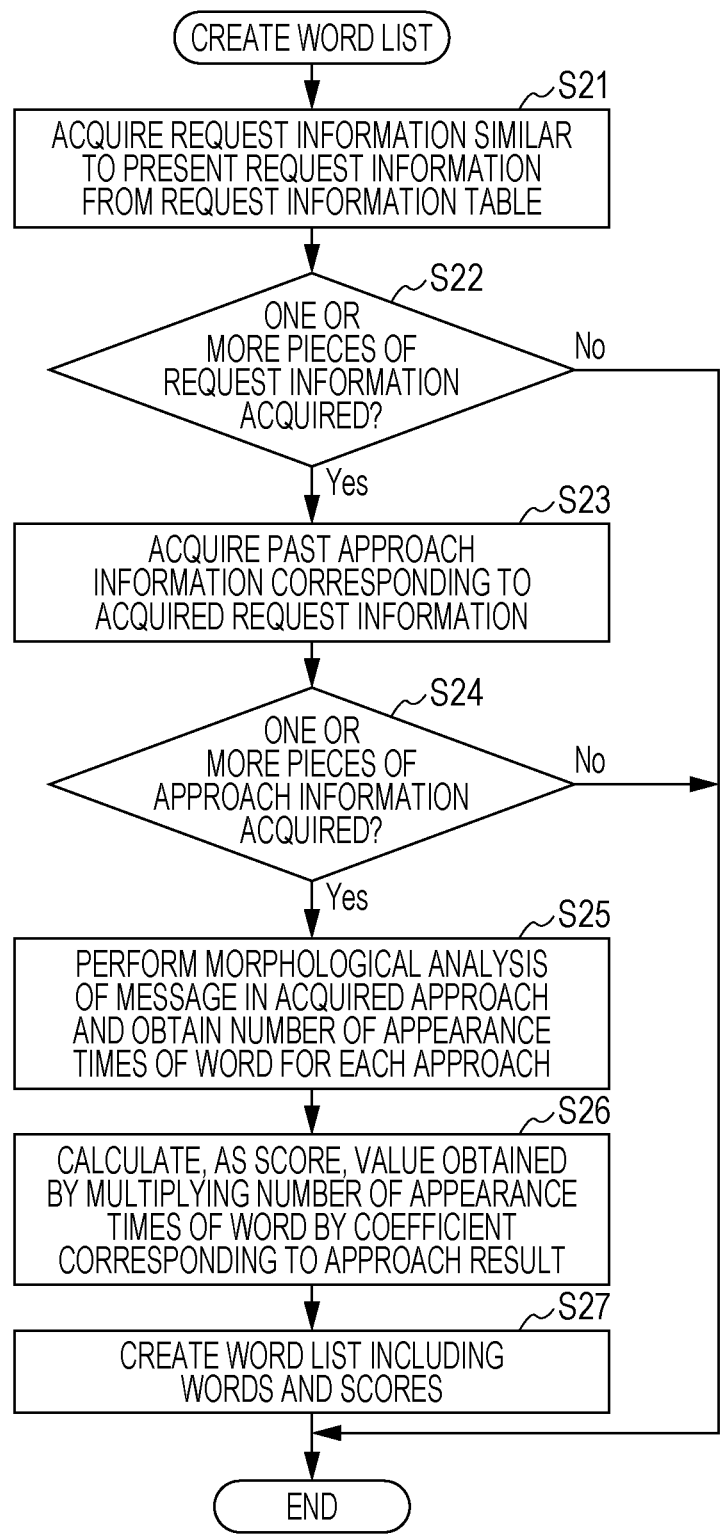
FIG. 12 is a flowchart illustrating the details of step S2 in FIG. 11.

Next, an example of an operation of the information processing system 1 will be explained with reference to FIGS. 4 to 12. FIG. 11 is a flowchart illustrating an example of an operation of the server apparatus 2. FIG. 12 is a flowchart illustrating the details of step S2 of FIG. 11. In the explanation provided below, a case where a user desires to use a coworking space will be explained.

(1) Overall Flow

First, the user operates the operation display unit 42 of the user terminal apparatus 4 to display a request registration screen on the operation display unit 42.

Figure 4:
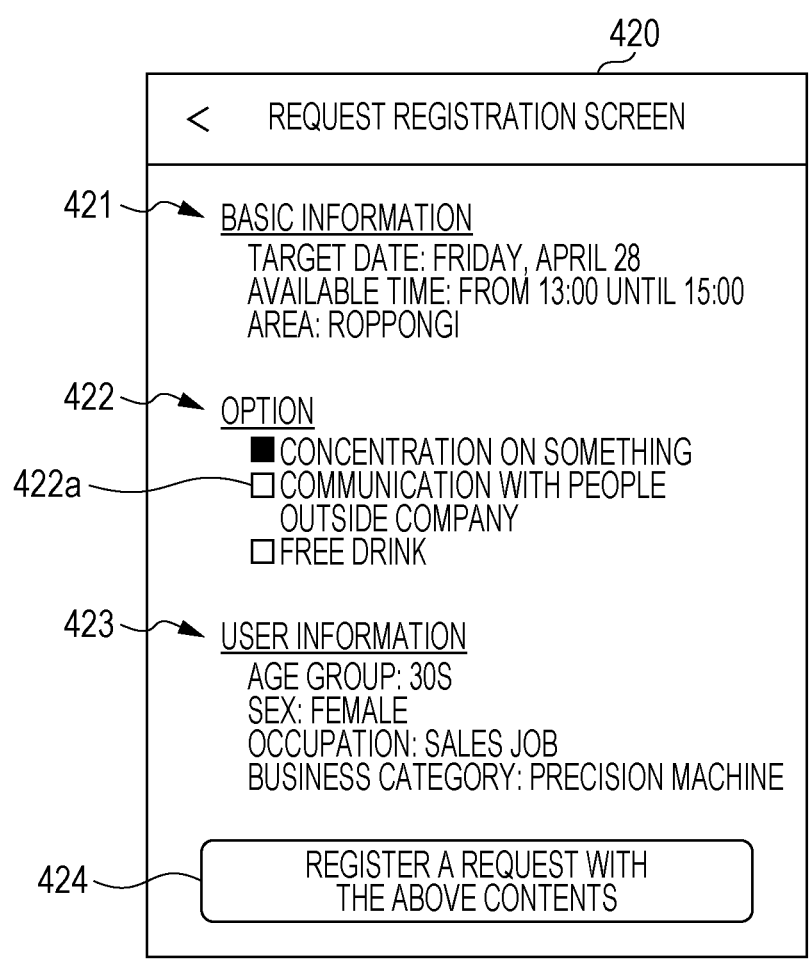
FIG. 4 is a diagram illustrating an example of a confirmation screen displayed on an operation display unit of a user terminal apparatus.

FIG. 4 is a diagram illustrating an example of the request registration screen. A request registration screen 420 illustrated in FIG. 4 includes, for example, basic information 421, option contents 422, user information 423, and a "register a request with the above contents" button 424. The basic information 421 includes, for example, a target date, an available time, and an area. For the option contents 422, for example, a user is able to select any of plural conditions such as "concentration on something", "communication with people outside company", and "free drink" by checking a corresponding check box 422a. The user information 423 includes, for example, an age group, sex, an occupation, and a business category.

As illustrated in the request registration screen 420 of FIG. 4, the user operates the operation display unit 42 of the user terminal apparatus 4 to input request information (user attribute information and request contents), and operates the "register a request with the above contents" button 424 to issue an instruction to transmit the request information. Then, the controller 40 transmits the request information 10 to the server apparatus 2 via the network 3.

The reception unit 200 of the server apparatus 2 receives the request information 10 transmitted from the user terminal apparatus 4, assigns a request ID to the request information 10, and records the request information 10 that is assigned the request ID into the request information table 211 (S1).

Figure 5:
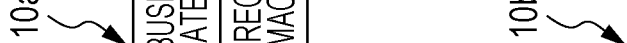
FIG. 5 is a diagram illustrating an example of present request information.

FIG. 5 is a diagram illustrating an example of present request information. In the example illustrated in FIG. 5, present request information 10a includes a request ID, a user ID, a request date and time, an age group, sex, an occupation, a business category, and option contents. A user ID, an age group, sex, an occupation, and a business category are an example of user attribute information. The present request information 10a is an example of corresponding request information.

The acquisition unit 201 and the evaluation unit 202 create a word list 23 (S2). The details of creation of the word list 23 will be described later with reference to FIG. 12.

The evaluation unit 202 creates the approach creation screen information 11 based on the request information 10 and the word list 23 and transmits the approach creation screen information 11 to each of the business operator terminal apparatuses 5 via the network 3 (S3).

Figure 10:
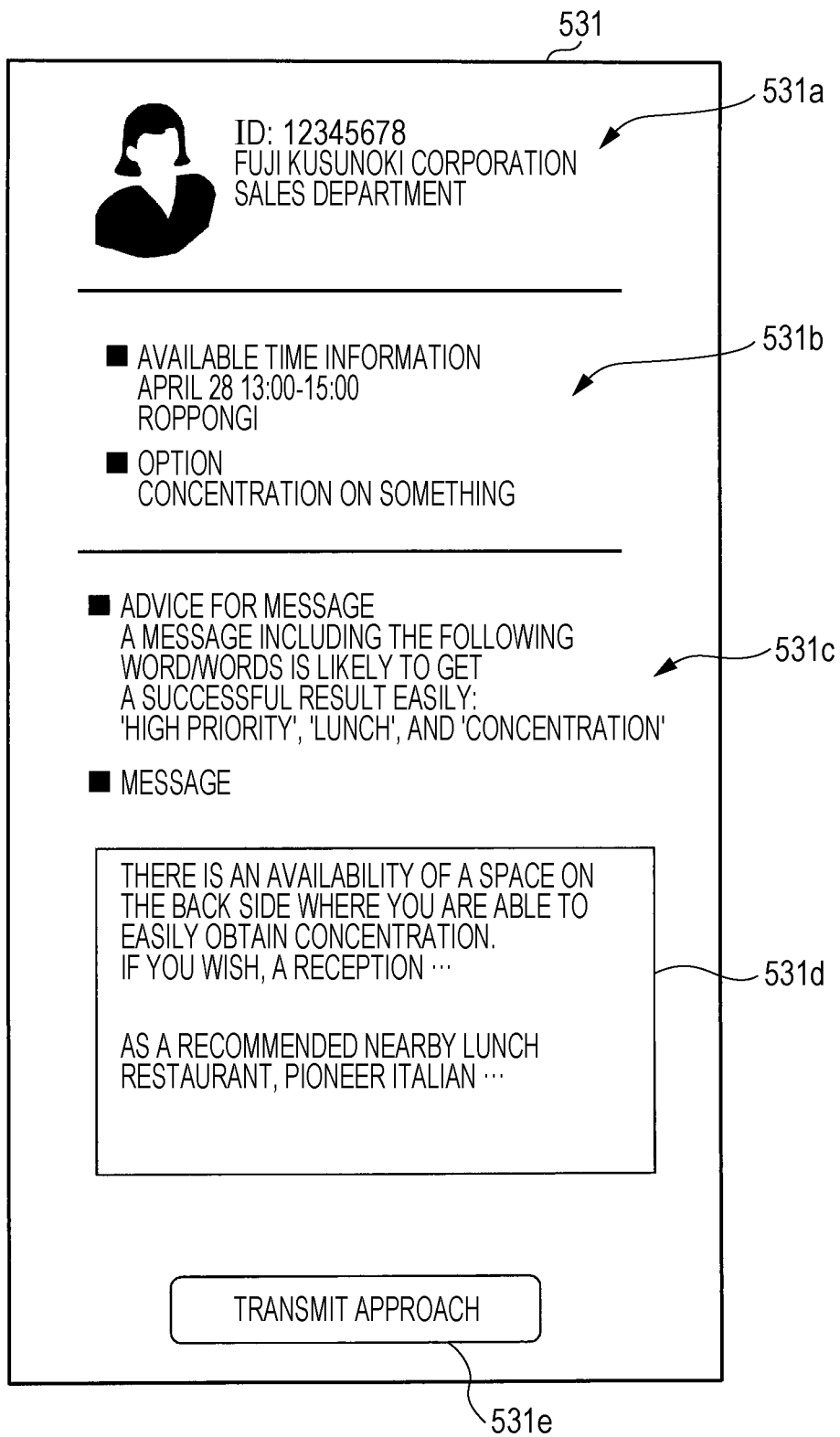
FIG. 10 is a diagram illustrating an example of an approach creation screen.

The controller 50 of each of the business operator terminal apparatuses 5 displays an approach creation screen 531, which is illustrated in FIG. 10, transmitted from the server apparatus 2 on the display 53. Each business operator operates the input unit 52 to input a message into a message input area 531d while viewing user attribute information 531a, request contents 531b, and an advice 531c for a message included in the approach creation screen 531, and creates the approach information 12. The controller 50 of each of the business operator terminal apparatuses 5 transmits the input approach information 12 to the server apparatus 2 via the network 3. The approach information 12 includes at least a message. In addition, as option contents, items such as presence or absence of an event, the estimated degree of congestion, and information of nearby shops may be added to the message.

When receiving the approach information 12 (S4: Yes), the reception unit 200 of the server apparatus 2 records the approach information 12 into the approach information table 212. The transmission unit 204 of the server apparatus 2 transmits the approach information 12 received by the reception unit 200 to the user terminal apparatus 4 (S5).

The controller 40 of the user terminal apparatus 4 displays the approach information 12 transmitted from the server apparatus 2 on the operation display unit 42. After that, the user makes a reservation for a requested place by referring to the displayed approach information 12, and uses the place.

(2) Details of Creation of Word List

Next, the details of creation of a word list in step S2 illustrated in FIG. 11 will be explained with reference to FIG. 12.

The acquisition unit 201 of the server apparatus 2 acquires request information similar to the present request information 10a from past request information in the request information table 211 (S21)

Figure 6:
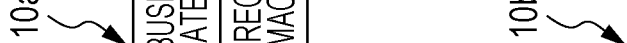
FIG. 6 is a diagram illustrating an example of past request information.

FIG. 6 is a diagram illustrating an example of past request information. Past request information 10b is acquired from the request information table 211 as request information with a similarity with respect to the present request information 10a illustrated in FIG. 5 that satisfies a threshold.

The acquisition unit 201 determines whether or not one or more pieces of request information have been acquired (S22). In the case where one or more pieces of request information have been acquired (S22: Yes), the acquisition unit 201 acquires past approach information corresponding to each piece of the acquired request information from the approach information table 212 (S23).

FIG. 7 is a diagram illustrating an example of approach information of a word extraction target acquired from the approach information table 212 as information corresponding to the request information illustrated in FIG. 6. Approach information 12a of a word extraction target illustrated in FIG. 7 includes an approach ID, an approach person ID for identifying an approach person, a request ID, an approach date and time, an approach comment, and an approach result. As an approach result, "use" is recorded when a reservation for service contents was made and the service contents were used, and "non-use" is recorded when service contents were not used although a reservation for the service contents was made or when no reservation was made for the service contents and the service contents were not used. A case where service contents were used although a reservation for the service contents was made and a case where no reservation was made for service contents and the service contents were not used may be recorded in a distinguished manner. An approach result is an example of success/failure information. "Use" is an example of success. "Non-use" is an example of failure.

In FIG. 7, a case where two approaches are registered for a request is illustrated. As a comment for an approach ID of "A659", "High-priority availability of this coworking space is provided to users who require concentration on something. . . . Information of nearby places for lunch is . . . " is provided, and "use" is obtained as an approach result. As a comment for an approach ID of "A661", "A seminar for users interested in starting a business will be being held at a seminar room on the designated date. If you have time, . . . availability of seats . . . " is provided, and "non-use" is obtained as an approach result.

The evaluation unit 202 determines whether or not one or more pieces of approach information have been acquired (S24). In the case where one or more pieces of approach information have been acquired (S24: Yes), the evaluation unit 202 performs morphological analysis of a message included in the acquired approach information and calculates the number of appearance times of a word for each approach (S25).

The evaluation unit 202 obtains, as a score, a value obtained by the number of appearance times of a word by a coefficient corresponding to an approach result (S26), and creates a word list including words and scores (S27).

Figure 8:
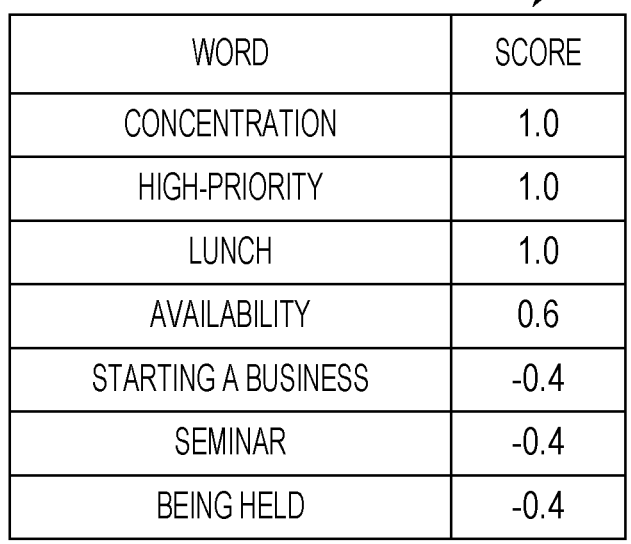
FIG. 8 is a diagram illustrating an example of a word list.

FIG. 8 is a diagram illustrating an example of a word list. As illustrated in FIG. 7, nouns "concentration", "high-priority", "availability", and "lunch" appear in a message with an approach result of "success (use)", and nouns "starting a business", "seminar", "being held", and "availability" appear in a message with an approach result of "failure (non-use). The noun "availability" appears in both the messages with approach results of "success (use)" and failure (non-use). As a result, scores are obtained as described below.

Scores of "concentration", "high-priority", and "lunch"=coefficient(1)×1(time)=1.0

Score of "availability"=coefficient(1)+coefficient(−0.4)×1(time)=0.6

Scores of "starting a business", "seminar", and "being held"=coefficient(−0.4)×1(time)=0.4

The creation unit 203 extracts plural (for example, three) nouns with highest scores from the word list 23 to create the advice 531c for a message. Next, the creation unit 203 creates the approach creation screen information 11 including the user attribute information 531a, the request contents 531b, the advice 531c for a message, and the message input area 531d.

The transmission unit 204 transmits the approach creation screen information 11 created by the creation unit 203 to each of the business operator terminal apparatuses 5. The approach creation screen information 11 is stored as an unprocessed approach for which no message is created into the memory 51. When a business operator operates the input unit 52 of the business operator terminal apparatus 5 to require display of an approach input screen, the controller 50 displays the approach input screen on the display 53.

Figure 9:
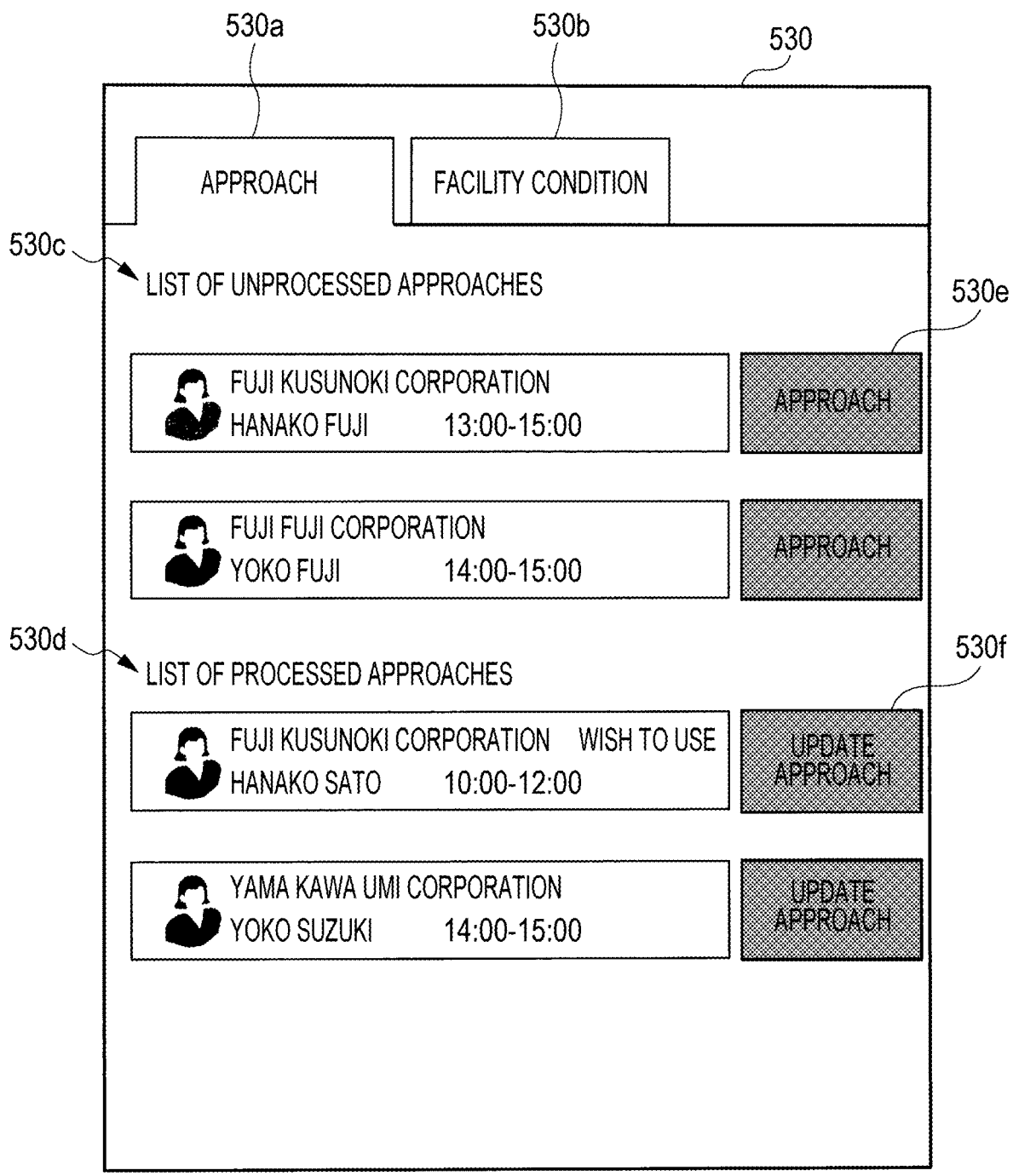
FIG. 9 is a diagram illustrating an example of an approach input screen displayed on a display of a business operator terminal apparatus.

FIG. 9 is a diagram illustrating an example of an approach input screen. An approach input screen 530 includes an "approach" tab 530a and a "facility condition" tab 530b. In FIG. 9, a state in which the "approach" tab 530a is selected is illustrated. On the approach input screen 530 displayed when the "approach" tab 530a is selected, a list 530c of unprocessed approaches and a list 530d of processed approaches are displayed. For the list 530c of unprocessed approaches, an "approach" button 530e is provided. When the "approach" button 530e is operated, an approach creation screen may be displayed on the display 53. For the list 530d of processed approaches, an "update approach" button 530f is provided. When the "update approach" button 530f is operated, contents of an approach may be corrected and transmitted again.

On the approach input screen 530 illustrated in FIG. 9, when the "approach" button 530e is operated, the controller 50 displays an approach creation screen on the display 53 of the business operator terminal apparatus 5.

FIG. 10 is a diagram illustrating an example of an approach creation screen. On the approach creation screen 531 illustrated in FIG. 10, the user attribute information (for example, a user ID, a company name, a department name, etc.) 531a, the request contents (an available time, a place, option contents, etc.) 531b, the advice 531c for a message, the message input area 531d, and an "approach transmission" button 531e are provided. In the case illustrated in FIG. 10, "A message including the following word/words is likely to get a successful result easily: 'high priority', 'lunch', and 'concentration'." is described as the advice 531c for a message. These words correspond to three words with highest scores in the word list 23 illustrated in FIG. 8.

The user writes a message into the message input area 531d by referring to the advice 531c for the message to create approach information. In the case illustrated in FIG. 10, "There is an availability of a space on the back side where you are able to easily obtain concentration. If you wish, a reception . . . As a recommended nearby lunch restaurant, pioneer Italian . . . " is described in the message input area 531d. The business operator is able to understand that the message is described using the words "concentration" and "lunch" described in the field of the advice for the message.

Second Exemplary Embodiment

Figure 13:
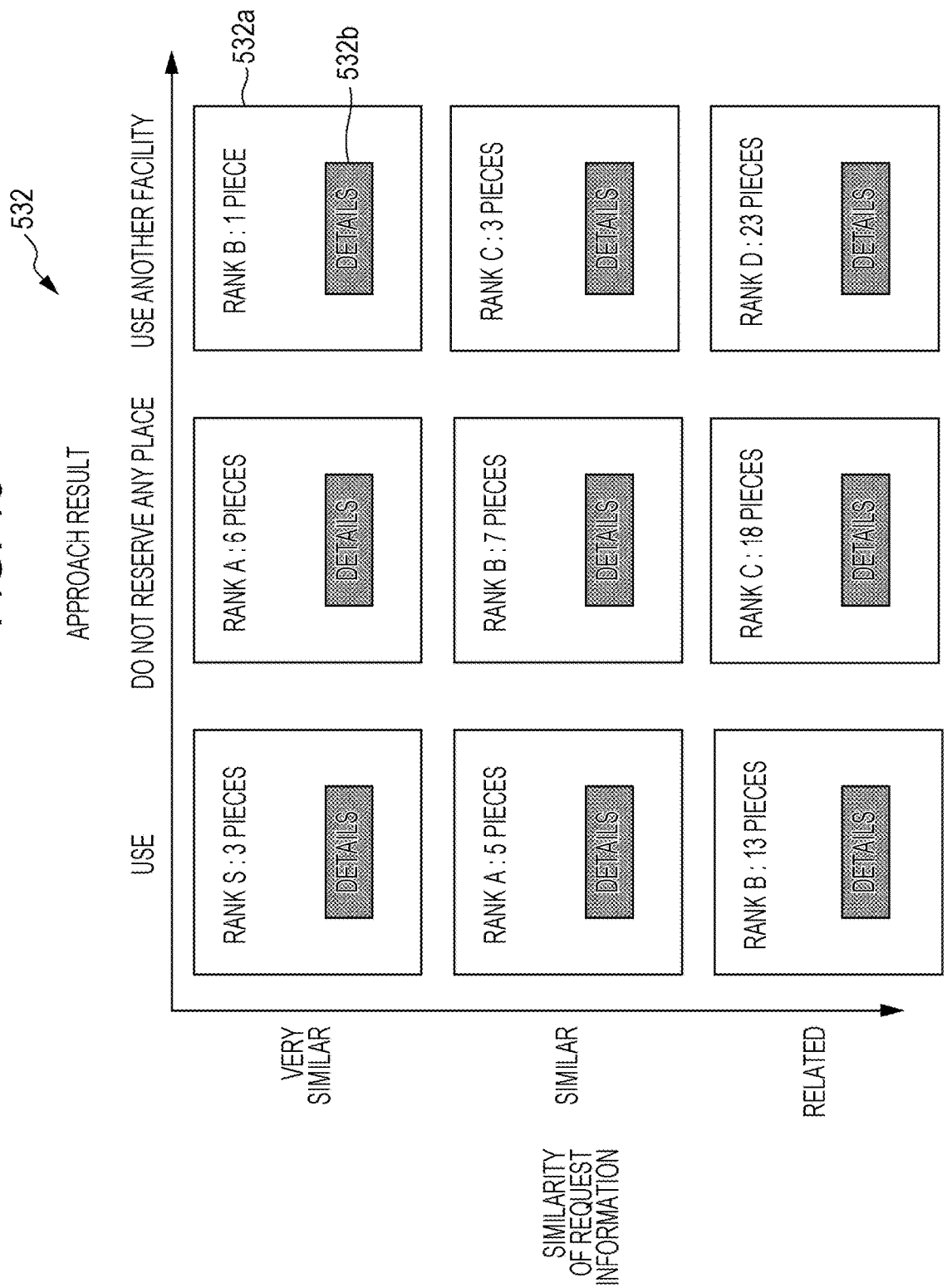
FIG. 13 is a diagram illustrating an example of a screen displayed on a business operator terminal apparatus according to a second exemplary embodiment of the present invention.

FIG. 13 is a diagram illustrating an example of a screen displayed on a business operator terminal apparatus according to a second exemplary embodiment of the present invention. In the first exemplary embodiment, approach creation screen information is created and displayed on a business operator terminal apparatus 5. In the second exemplary embodiment, matrix screen information in which thumbnail images of approach information are arranged in a two-dimensional manner is further created and displayed on the business operator terminal apparatus 5. Hereinafter, explanation will be focused on differences from the first exemplary embodiment.

The creation unit 203 of the server apparatus 2 creates matrix screen information in which thumbnail images of approach information are arranged in a two-dimensional manner. Specifically, the creation unit 203 arranges thumbnail images of approach information in sections corresponding to approach results, and creates matrix screen information in which thumbnail images of approach information are arranged in sections corresponding to similarities of request information.

The transmission unit 204 transmits the matrix screen information created by the creation unit 203 to the business operator terminal apparatus 5.

FIG. 13 is a diagram illustrating an example of a matrix screen displayed on a display of the business operator terminal apparatus 5, based on matrix screen information. On a matrix screen 532 illustrated in FIG. 13, approach results are categorized into "use", "do not reserve any place", and "use another facility". The server apparatus 2 acquires information indicating that nothing is reserved and information indicating that another facility is used from approach results from the business operator terminal apparatus 5. Similarities of request information are categorized into "very similar", "similar", and "related". "Very similar" and "similar" represent that similarities of request information satisfy a threshold. Thumbnail images 532a of approach information are arranged in a matrix manner in association with individual sections.

Ranking illustrated in FIG. 13 indicates, for example, ranks S, A, B, and so on in order from the highest usage fee. The number of pieces represents the number of pieces of approach information. The thumbnail images 532a of approach information illustrated in FIG. 13 may include approach information of other business operators or include only own approach information. Furthermore, when a details button 532b included in each of the thumbnail images 532a is operated, a window of a detailed screen is opened.

Third Exemplary Embodiment

Figure 14:
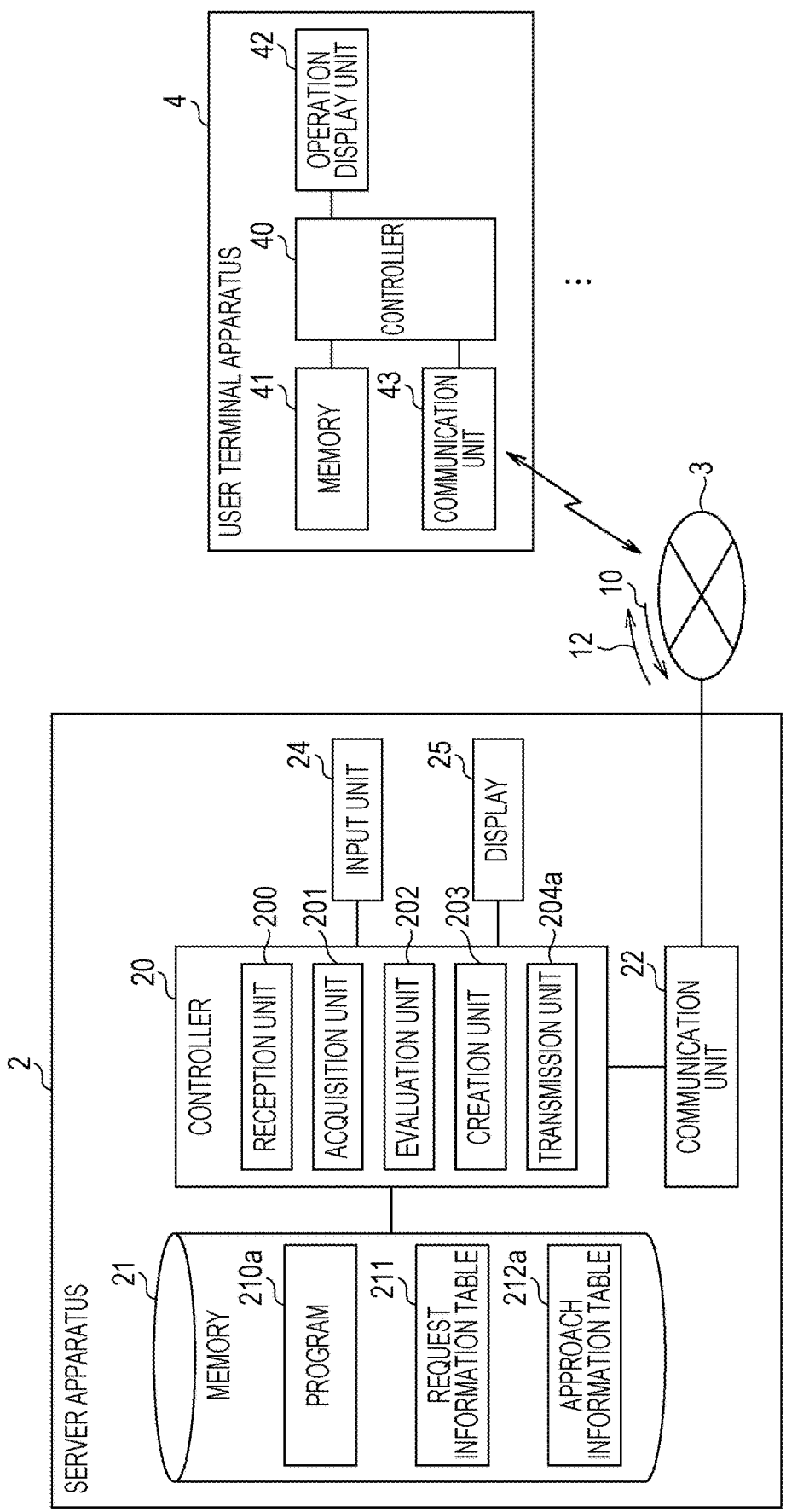
FIG. 14 is a block diagram illustrating an example of a control system of an information processing system according to a third exemplary embodiment of the present invention.

FIG. 14 is a block diagram illustrating an example of a control system of an information processing system according to a third exemplary embodiment of the present invention. In the first exemplary embodiment, the presentation unit presents words to the business operator terminal apparatuses 5 connected via a network. However, in the third exemplary embodiment, words are presented to a display included in an information processing apparatus. Hereinafter, explanation will be focused on differences from the first exemplary embodiment.

The information processing system includes the server apparatus 2 and the plural user terminal apparatuses 4 connected to the server apparatus 2 via the network 3.

The server apparatus 2 includes the controller 20 that controls each unit of the server apparatus 2, the memory 21 that stores various types of information, an input unit 24 that is implemented by a keyboard, a mouse, and the like, a display 25 that is implemented by a liquid crystal display or the like, and the communication unit 22 that is implemented by an NIC or the like and communicates with the outside via the network 3. The display 25 is an example of an output unit.

The controller 20 includes a CPU, an interface, and the like. The CPU functions as the reception unit 200, the acquisition unit 201, the evaluation unit 202, the creation unit 203, a transmission unit 204a, and the like by operating in accordance with a program 210a. The details of the reception unit 200, the acquisition unit 201, the evaluation unit 202, the creation unit 203, and the transmission unit 204a will be described later. The evaluation unit 202, the creation unit 203, and the transmission unit 204a are an example of a presentation unit.

The memory 21 includes a ROM, a RAM, a hard disk, and the like. The memory 21 stores the program 210a, the request information table 211, an approach information table 212a, and the like.

In the third exemplary embodiment, information regarding a business operator is recorded in the approach information table 212a. Attribute information of a business operator is not recorded in the approach information table 212 illustrated in FIG. 3B.

The transmission unit 204a transmits the approach creation screen information 11 to the display 25, so that an approach creation screen may be displayed on the display 25. Approach creation screen information may be printed and output.

Other Exemplary Embodiments

Exemplary embodiments of the present invention have been described above. However, the exemplary embodiments of the present invention are not limited to the foregoing exemplary embodiments. Various changes and implementations may be made without departing from the scope of the present invention.

Each unit of each of the controllers 20 and 60 may be partially or entirely configured as a hardware circuit such as a field programmable gate array (FPGA), an application specific integrated circuit (ASIC), or the like.

Part of components of the foregoing exemplary embodiments may be omitted or changed without departing from the scope of the present invention. Furthermore, addition, deletion, change, replacement, or the like of steps in a flow of the foregoing exemplary embodiments may be made without departing from the scope of the present invention. Furthermore, a program used in the foregoing exemplary embodiments may be recorded in a computer-readable recording medium such as a compact disc-read only memory (CD-ROM) or the like and supplied or may be stored in an external server such as a cloud server and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores, as history information,
   (i) first information including
      attribute information of a user, and
      service content requested by the user,
   (ii) second information including
      suggested service content that was suggested to the user in response to the requested service content, and
      a message prompting use of the suggested service content, and
   (iii) success/failure information indicating whether or not the suggested service content was used by the user, with the proviso that
      when the suggested service content was used by the user, the success/failure information indicates a success, and
      when the suggested service content was not used by the user, the success/failure information indicates a failure,
the memory storing the first information, the second information, and the success/failure information for each of a plurality of past users; and
a processor programmed to:
   receive new first information from a current new user different from the plurality of past users, the new first information including
      attribute information of the current new user, and
      new service content requested by the current new user;
   search the history information stored in the memory searching for two or more pieces of the first information associated with two or more of the plurality of past users and having a similarity with respect to the new first information equal to or greater than a threshold; and
   in response to finding the two or more pieces of the first information, automatically acquire two or more pieces of the second information respectively associated with the found two or more pieces of the first information;
   extract a word from messages in the acquired two or more pieces of the second information, based on a number of appearance times of the word and associated success/failure information with the acquired two or more pieces of the second information,
   wherein the success is associated with use and the failure is associated with non-use of the service suggested using the extracted word;
   create two or more message creation screens respectively corresponding to the two or more pieces of the first information, the two or more message creation screens including the extracted word;
   transmit, to a service provider, the created two or more message creation screens arranged according to the respective similarity of the two or more pieces of the first information with respect to the new first information, wherein:

the service provider inputs a new message using the extracted word through at least one of the two or more message creation screens; and the new message is presented to the current new user along with new suggested service content.

2. The information processing apparatus according to claim 1, wherein the processor is programmed to calculate, for each word included in the messages in the acquired two or more pieces of second information, an evaluation value obtained by multiplying the number of appearance times by a coefficient corresponding to the associated success/failure information.

3. The information processing apparatus according to claim 2, wherein the coefficient is higher when the associated success/failure information indicates a success than when the associated success/failure information indicates a failure.

4. The information processing apparatus according to claim 3, wherein the coefficient is a negative value when the associated success/failure information indicates a failure.

5. The information processing apparatus according to claim 2, wherein each of the created two or more message creation screens, which are transmitted to the service provider, includes the new first information received from the current new user, a plurality of the words included in the messages, which are displayed more preferentially as the evaluation value increases, and a region in which the new message can be input by the service provider.

6. The information processing apparatus according to claim 5, wherein the processor is programmed to transmit screen information regarding each of the created two or more message creation screens to an external apparatus associated with the service provider.

7. The information processing apparatus according to claim 5, wherein the processor is programmed to perform control such that the two or more message creation screens are output to a display device.

8. The information processing apparatus according to claim 5, wherein the two or more message creation screens are arranged according to the associated success/failure information.

9. The information processing apparatus according to claim 2, wherein the coefficient is different for each of a case where the associated success/failure information indicates that the suggested service content was used by the user, a case where the associated success/failure information indicates that the suggested service content was not used by the user although a reservation was made, and a case where the associated success/failure information indicates that the suggested service content was not used by the user, and a reservation was not made.

10. The information processing apparatus according to claim 1, wherein the processor is programmed to:

find four or more pieces of the first information associated with four or more of the plurality of past users and having a similarity with respect to the new first information equal to or greater than the threshold;

create four or more message creation screens each corresponding to a respective one of the found four or more pieces of the first information; and transmit, to the service provider, the created four or more message creation screens arranged in a matrix according to the respective similarity of the corresponding first information with respect to the new first information along one axis of the matrix and according to the associated success/failure information along another axis of the matrix.

11. The information processing apparatus according to claim 1, wherein the processor is programmed to:

extract a list of words from the messages;

calculate a numerical score for each word in the list based on the number of appearance times and the associated success/failure information; and create the two or more message creation screens each including, among the list of words, a word having the highest calculated score.

12. An information processing apparatus comprising:

storage means for storing, as history information, (i) first information including attribute information of a user, and service content requested by the user, (ii) second information including suggested service content that was suggested to the user in response to the requested service content, and a message prompting use of the suggested service content, and (iii) success/failure information indicating whether or not the suggested service content was used by the user, with the proviso that when the suggested service content was used by the user, the success/failure information indicates a success, and when the suggested service content was not used by the user, the success/failure information indicates a failure, the storage means storing the first information, the second information, and the success/failure information for each of a plurality of past users;

reception means for receiving new first information from a current new user different from the plurality of past users, the new first information including attribute information of the current new user, and new service content requested by the current new user;

acquisition means for searching the history information stored in the storage means searching for two or more pieces of the first information associated with two or more of the plurality of past users and having a similarity with respect to the new first information equal to or greater than a threshold, and in response to finding the two or more pieces of the first information, automatically acquiring two or more pieces of the second information respectively associated with the found two or more pieces of the first information;

presentation means for extracting a word from messages in the acquired two or more pieces of the second information, based on a number of appearance times of the word and associated success/failure information with the acquired two or more pieces of the second information, wherein the success is associated with use and the failure is associated with non-use of the service suggested using the extracted word;
creating two or more message creation screens respectively corresponding to the two or more pieces of the first information, the two or more message creation screens including the extracted word; and
transmitting, to a service provider, the created two or more message creation screens arranged according to the respective similarity of the two or more pieces of the first information with respect to the new first information, wherein
the service provider inputs a new message using the extracted word through at least one of the two or more message creation screens; and
message reception means for receiving the new message from the service provider, so that the new message is presented to the current new user along with new suggested service content.

* * * * *